(12) United States Patent
Veenhof

(10) Patent No.: US 9,889,994 B1
(45) Date of Patent: Feb. 13, 2018

(54) CONVEYOR SCRAPER ADJUSTMENT MECHANISM

(71) Applicant: Willem Veenhof, Brevard, NC (US)

(72) Inventor: Willem Veenhof, Brevard, NC (US)

(*) Notice: Subject to any disclaimer, the term of this patent is extended or adjusted under 35 U.S.C. 154(b) by 0 days.

(21) Appl. No.: 15/481,057

(22) Filed: Apr. 6, 2017

(51) Int. Cl.
*B65G 45/16* (2006.01)

(52) U.S. Cl.
CPC .................. *B65G 45/16* (2013.01)

(58) Field of Classification Search
CPC ......... B65G 45/12; B65G 45/14; B65G 45/16
USPC ........................................ 198/497, 498, 499
See application file for complete search history.

(56) References Cited

U.S. PATENT DOCUMENTS

| | | | |
|---|---|---|---|
| 2,794,540 A | 6/1957 | Sinden | |
| 3,631,968 A | 1/1972 | Ward | |
| 4,249,650 A * | 2/1981 | Stahura | B65G 45/16 15/256.5 |
| 4,344,525 A * | 8/1982 | Bancroft | B65G 45/12 198/497 |
| 4,754,868 A | 7/1988 | Hughes | |
| 4,936,439 A * | 6/1990 | Alexander, Jr. | B65G 45/16 15/256.5 |
| 5,310,042 A * | 5/1994 | Veenhof | B65G 45/12 198/497 |
| 6,454,080 B1 * | 9/2002 | Brink | B65G 45/16 198/497 |
| 6,581,754 B2 * | 6/2003 | Law | B65G 45/12 15/256.51 |
| 6,874,616 B2 * | 4/2005 | DeVries | B65G 45/16 198/499 |
| 7,987,966 B2 * | 8/2011 | DeVries | B65G 45/16 198/497 |
| 8,061,508 B2 * | 11/2011 | Metzner | B65G 45/12 198/497 |
| 9,162,827 B2 * | 10/2015 | Brunone | B65G 45/16 |
| 9,586,765 B2 * | 3/2017 | Krosschell | B65G 45/16 |
| 2004/0149544 A1 * | 8/2004 | Dal Ferro | B65G 45/12 198/499 |

* cited by examiner

*Primary Examiner* — Leslie A Nicholson, III
*Assistant Examiner* — Keith R Campbell
(74) *Attorney, Agent, or Firm* — Joseph T. Guy

(57) ABSTRACT

A mechanism for mounting and adjusting a conveyor belt scraper comprises a conveyor belt assembly capable of receiving and disposing of material on a surface thereof and a structural element wherein the structural element comprises a securing member. The mechanism further comprises a belt scraper comprising a slide plate capable of slidably receiving the securing member. A release mating bracket is provided which is capable of being reversibly drawn towards a fixed mating bracket wherein at least one of the fixed mating bracket or release mating bracket comprises a recess. An orientable mandrel is received between the fixed mating bracket and the release mating bracket. A scraper assembly is attached to the orientable mandrel.

8 Claims, 5 Drawing Sheets

CONVEYOR SCRAPER ADJUSTMENT MECHANISM

BACKGROUND

The instant invention is related to a conveyor system and a scraper therefore. More specifically, the present invention is related to an improved method for mounting and adjusting the tension of a scraper for a conveyor system.

Conveyor systems comprising a continuous belt are well known and used in many industries wherein movement of material over a distance is desired. A particularly important use is the movement of large quantities of material; such as dirt, ore, coal and minerals; from a mine to a transport system such as a truck or railcar outside of the mine. Another important application is the movement of materials to a hopper or storage unit. In many cases the continuous belt, which is typically many meters and can be many kilometers in length, comprises some form of rubber or reinforced rubber and particulates tend to adhere to the rubber. It is therefore very common to have a scraper in contact with the underside of the belt typically, immediately after the point of discharge.

An exemplary conveyor belt scraping or cleaning device is described in WO 2015/134348, by the same inventor. Though there are many variations, the necessary components of a conveyor cleaning device includes a frame for mounting to a structural element of the conveyor assembly and a scraper which is in contact with the belt. Though simplistic in general principle the implementation of a conveyor belt scraper or cleaner is very difficult as the pressure applied to the belt, by the scraper, is of utmost importance and achieving the proper pressure is the subject of much research and design alterations. If the pressure is insufficient the scraper fails to adequately remove particles adhered to the belt. If the pressure is excessive the belt can wear prematurely, the belt tends to overheat which may make the belt softer and therefore more susceptible to adhesion of particles and the belt may actually fail catastrophically which has obvious undesirable ramifications.

A conventional adjustment system for a conveyor belt cleaning or scraping system is illustrated in schematic view, and will be described with reference to, FIG. 1. In FIG. 1, a conveyor belt, 10, generally moving in the direction of arrow, 12, is engaged with a pulley, 14, which may be a drive pulley, thereby passing over a scraper assembly comprising a scraper, 16, wherein the scraper is engaged with the bottom of the conveyor belt. As would be realized, material being transported, 18, is carried on the conveyor and is discharged as the conveyor partially circumnavigates a portion of the pulley and returns for subsequent loading of material wherein the path of the conveyor belt repeatedly traverses a fixed path referred to herein as a track. The scraper is attached to, or integral to, a frame, 20, which may be quite complex including spring mechanisms and the like with further discussions thereof being unnecessary here. The frame, 20, is translationally attached to a bracket, 22, preferably mounted on a fixed structural element, 24, such as a structural component of the conveyor system. A threaded member, 26, is received by a mating threaded hole in the frame and therefore the height of the frame and scraper can be altered by rotation of the threaded member as would be readily understood to those of skill in the art. There are certain advantages to the conventional adjustment mechanism, as illustrated schematically in FIG. 1, including fine control of the height of the scraper and therefore the pressure and ease of operation and therefore this type of adjustment system has been the predominant system of choice.

There are problems with the conventional adjustment mechanism represented by FIG. 1 one of which is realized when routine maintenance is necessary. It is not uncommon for scrapers to become damaged, worn or dislodged thereby requiring the frame to be moved away from the conveyor belt to disengage the scraper from the conveyor belt for repair. Once the repair is complete the frame is moved towards the conveyor belt to reengage the scraper. Achieving the proper pressure on the belt is a difficult task and each time the scraper engagement is altered adjustment is required. This is a major source of maintenance cost for conveyor operators and owners and the impact of improper pressure can be devastating. Furthermore, the adjustment is subject to the judgement of the operator which leads to inconsistencies.

There is an ongoing, and long felt, desire for a mechanism of adjustment for a conveyor belt scraper or cleaner which is less susceptible to degradation by materials and which can allow for rapid, and repeatable adjustment after routine repairs. Such a system is provided herein.

SUMMARY OF THE INVENTION

It is an object of the invention to provide an improved system for adjustment of a conveyor belt scraper or cleaner mechanism.

A particular feature of the invention is the ability to reproducibly set the pressure placed on a conveyor belt by a scraper blade.

Yet another feature of the invention is the ability to change or replace components of the conveyor belt cleaner or scraper without irreversibly altering the adjustment of the pressure placed on the conveyor belt by a scaper blade.

These and other embodiments, as will be realized, are provided in a mechanism for mounting and adjusting a conveyor belt scraper or cleaner. The mechanism comprises a conveyor belt assembly comprising a conveyor belt capable of receiving and disposing of material on a surface thereof and a structural element fixed relative to a track of said conveyor belt wherein the structural element comprises a securing member. The mechanism further comprises a belt scraper or cleaner assembly comprising a slide plate slidably attached to the structural element wherein the slide plate comprises at least one elongated slot capable of slidably receiving the securing member. A fixed mating bracket is attached to the slide plate. A release mating bracket is provided which is capable of being reversibly drawn towards the fixed mating bracket wherein at least one of the fixed mating bracket or release mating bracket comprises a recess. An orientable mandrel is received between the fixed mating bracket and the release mating bracket wherein the orientable mandrel comprises at least one orientation face wherein the orientation face engages with the recess when the fixed mating bracket and the release mating bracket are drawn together. Engagement of the recess and the orientation face reversibly prohibits rotation of the orientable mandrel relative to the structural element. A scraper assembly is attached to the orientable mandrel wherein the scraper assembly comprises a scraper capable of engaging with the conveyor belt at a location past a point of discharge.

Yet another embodiment is provided in a method for adjusting a conveyor belt scraper or cleaner. The method comprises providing a conveyor belt assembly wherein the conveyor belt assembly comprises a conveyor belt capable of receiving and disposing of material on a surface thereof and a structural element which is fixed relative to a track of the conveyor belt wherein the structural element comprises a securing member. Mounting a conveyor belt scraper or cleaner assembly to the conveyor belt assembly wherein the conveyor belt scraper or cleaner assembly comprises a slide plate slidably attached to the structural element wherein the slide plate comprises at least one elongated slot and the elongated slot receives the securing member. A fixed mating bracket is attached to the slide plate. Mounting a conveyor belt scraper or cleaner assembly to the conveyor belt assembly wherein the conveyor belt scraper or cleaner assembly comprises a slide plate slidably attached to the structural element and wherein the slide plate comprises at least one elongated slot wherein the elongated slot receives the securing member. A fixed mating bracket is attached to the slide plate. A release mating bracket is provided which is capable of being reversibly drawn towards the fixed mating bracket wherein at least one of the fixed mating bracket or the release mating bracket comprises a recess. An orientable mandrel is received between the fixed mating bracket and the release mating bracket wherein the orientable mandrel comprises at least one orientation face wherein the orientation face engages with the recess when the fixed mating bracket and the release mating bracket are drawn together. The engagement of the recess and the orientation face reversibly prohibits rotation or movement of the orientable mandrel relative to the structural element. A scraper assembly is attached to the orientable mandrel wherein the scraper assembly comprises a scraper capable of engaging with the conveyor belt at a location past a point of discharge. Drawing the release mating bracket towards the fixed mating bracket engages the orientation face in the recess. Adjustment is accomplished by moving the slide plate towards the conveyor belt with the securing member sliding in the elongated slot until the scraper is a desired distance from the conveyor belt and then separating the release mating bracket from the fixed mating bracket thereby allowing the orientation face to disengage with the recess and allowing the orientation mandrel to rotate or move wherein the scraper moves away from the conveyor belt. The slide plate is then moved a predetermined distance towards the conveyor belt with the securing member sliding in the elongated slot followed by tightening the securing member and drawing the release mating bracket towards the fixed mating bracket thereby engaging the orientation face with the recess to persuade the orientation mandrel to rotate or move the scraper towards and engage with the conveyor belt.

DESCRIPTION

The present invention is related to an improved conveyor belt cleaning or scraping system. More specifically, the present invention is related to an improved conveyor belt cleaning or scraping system wherein the scraper can be disengaged from contact with the conveyor, such as for maintenance, and reengaged quickly and returned to an engaged relationship without further adjustment. Even more specifically, the present invention is related to a moveably, preferably rotatable, adjustment mechanism wherein the scraper can be rotated or moved out of contact and back to the point of engagement accurately.

The invention will be described with reference to the figures which form an integral, non-limiting, component of the disclosure. Throughout the specification similar elements will be numbered accordingly.

Figure 1:
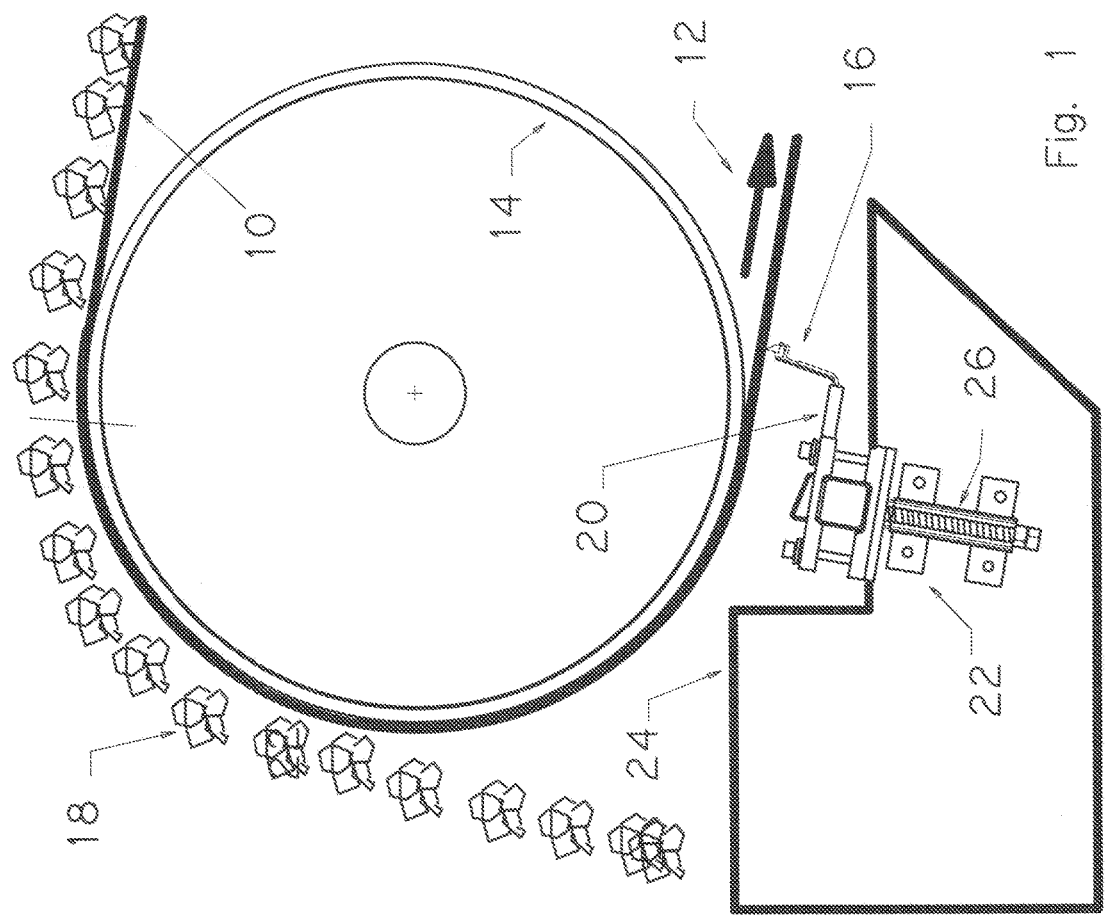
FIG. 1 is a side schematic view of a prior art device.
Figure 2:
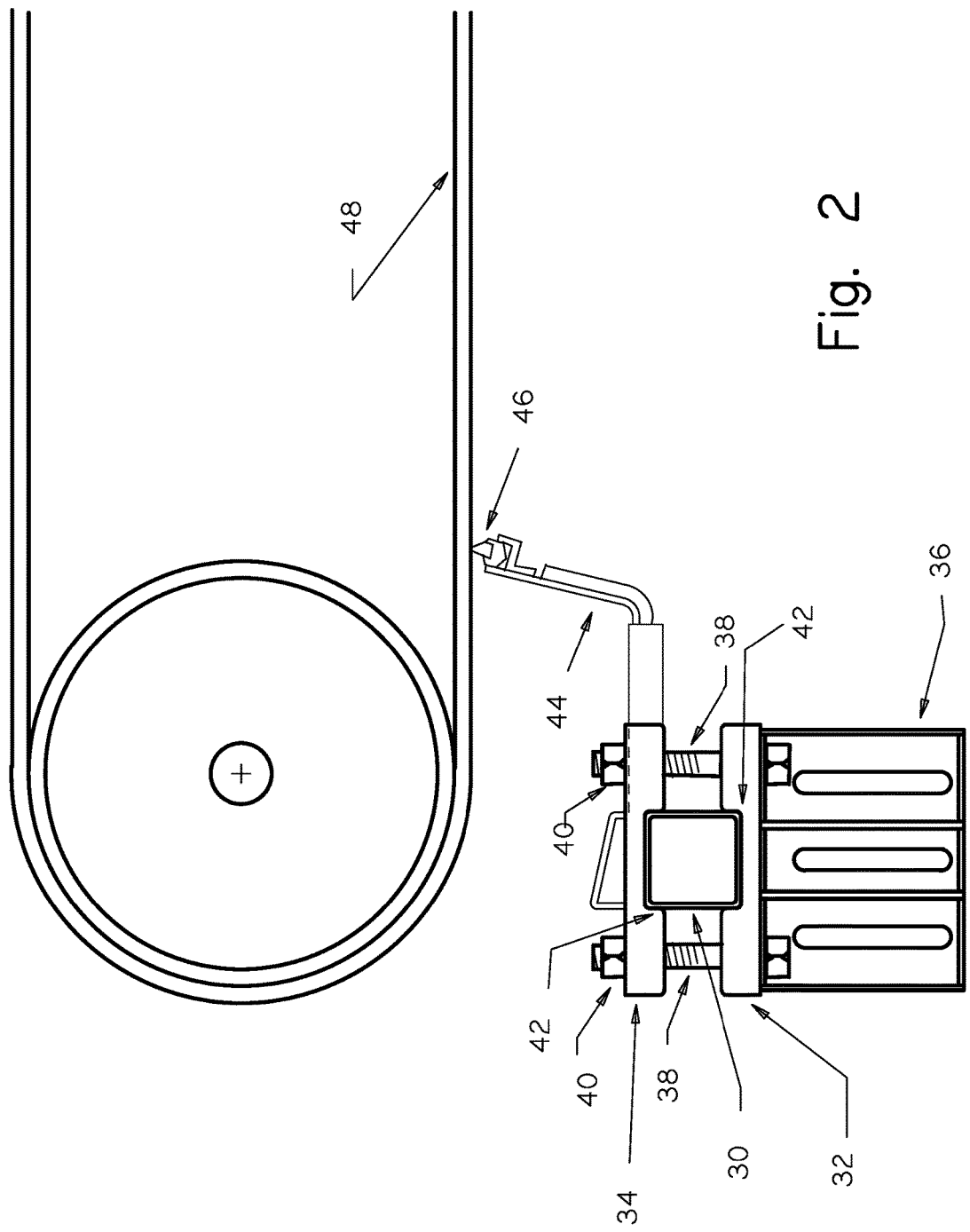
FIG. 2 is a side schematic view of an embodiment of the invention.
Figure 3:
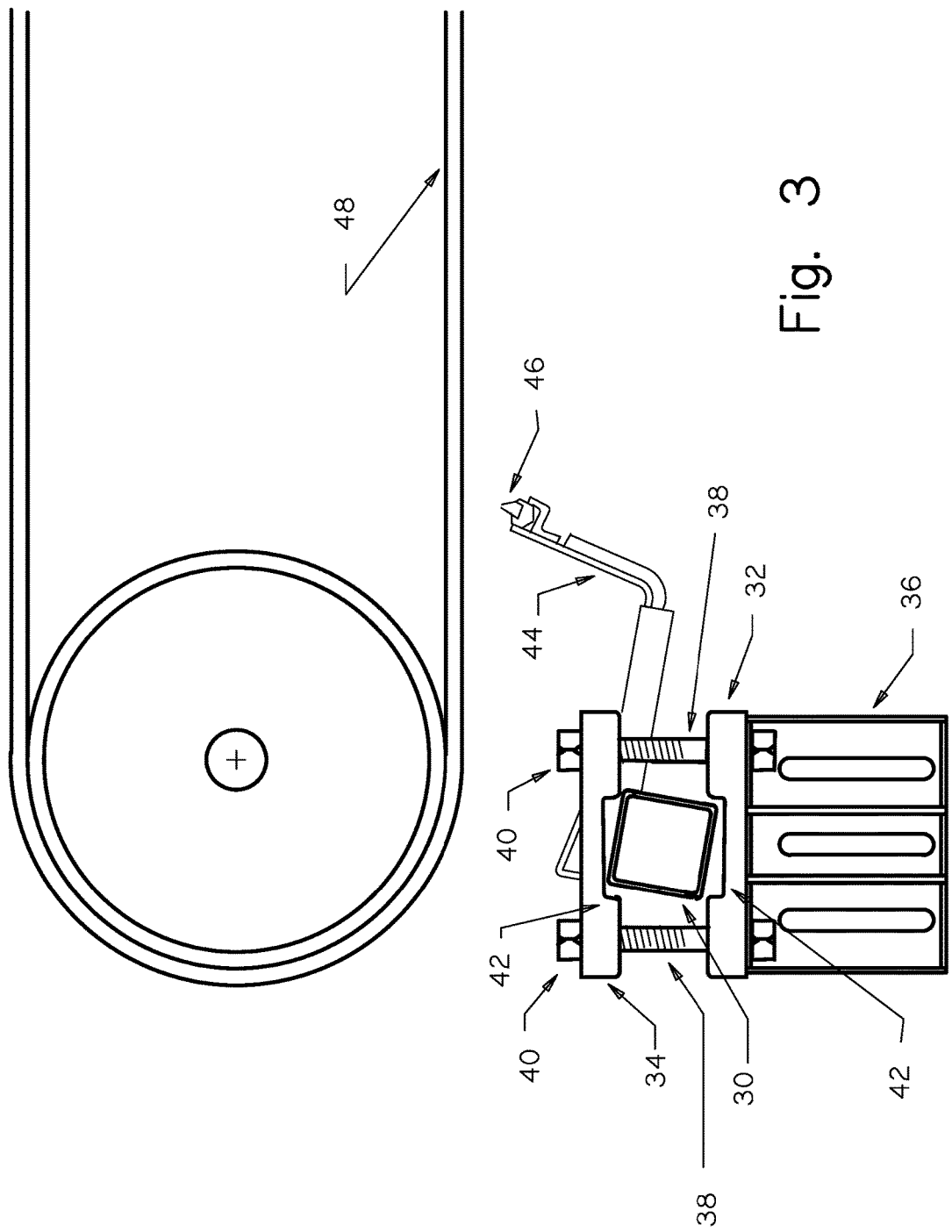
FIG. 3 is a side schematic view of an embodiment of the invention.

An embodiment of the invention will be described with reference to FIGS. 2 and 3. FIG. 2 is a schematic side view with the scraper engaged with the conveyor belt. FIG. 3 is a schematic side view with the scraper disengaged with the conveyor belt. In FIG. 2 an orientable mandrel, 30, is orientationally and rotationally fixed between a fixed mating bracket, 32, and a release mating bracket, 34. The fixed mating bracket is attached, or integral, to a slide plate, 36, which will be described with more detail herein. The fixed mating bracket and release mating bracket are drawn towards each other, preferably by threaded post, 38, and mating nuts, 40, thereby rotationally and orientationally fixing the orientable mandrel within recesses, 42, with the orientable mandrel received in the recesses and, when received therein, the orientable mandrel is rotationally and orientationally fixed. A blade bearing extension, 44, is attached to the orientable mandrel in any manner sufficient to prohibit rotation or movement of the blade bearing extension relative to the orientable mandrel. A scraper blade, 46, is attached to the blade bearing extension extending towards the conveyor belt, 48, such that when the orientable mandrel is positionally fixed, by engagement with the fixed mating bracket and release mating bracket, the scraper blade is in functional engagement with the conveyor belt.

In FIG. 3 the threaded post, 38, and mating nuts, 40, are shown manipulated to allow the release of the mating bracket, 34, to physically separate from the fixed mating bracket, 32, thereby disengaging the orientable mandrel from within the recesses and allowing the orientable mandrel to rotate and/or move a sufficient amount to disengage. As the orientable mandrel moves, represented as a clockwise rotation in FIG. 3, the blade bearing extension and scraper blade rotates or moves in concert with the orientable mandrel thereby rotating or moving the scraper blade out of engagement with the conveyor belt, 48. After servicing, the threaded post, 38, and mating nuts, 40, are manipulated to draw the release mating bracket, 34, toward the fixed mating bracket, 32, thereby reengaging the orientable mandrel within the recesses and inhibiting the orientable mandrel from movement or rotation as illustrated in FIG. 2.

Figure 4:
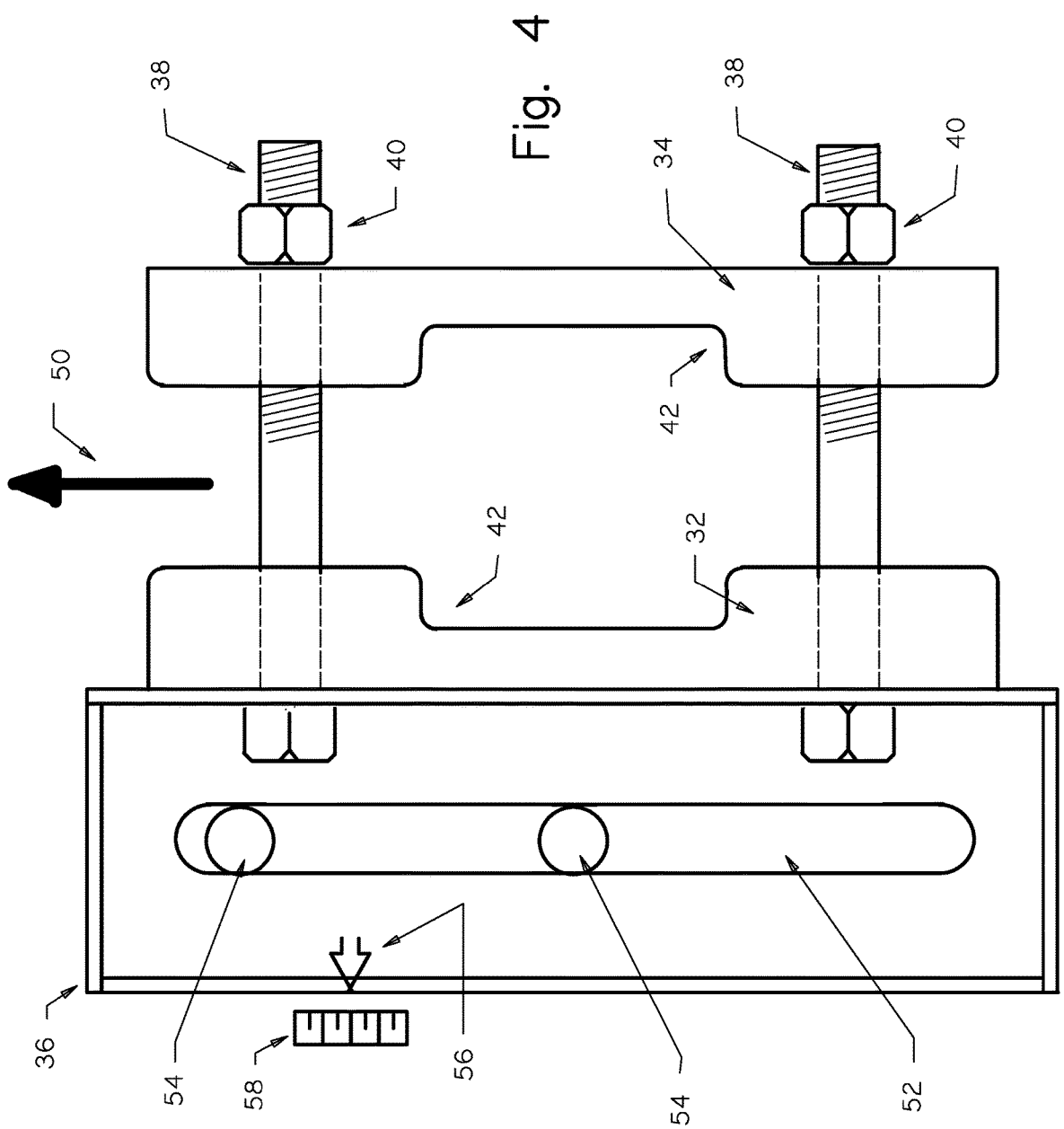
FIG. 4 is a side schematic view of an embodiment of the invention.

An embodiment of the invention, and method of operation, will be described with reference to FIG. 4. In FIG. 4, a fixed mating bracket, 32, release mating bracket, 34, slide plate, 36, threaded post, 38, and mating nuts, 40, are shown in side view, without the orientable mandrel, for the purposes of further discussion of the slide plate, 36, and method of operation. As would be realized the fixed mating bracket, 32, is attached to the slide plate when the orientable mandrel is engaged by the recesses, 42. For the purposes of discussion the conveyor belt, not shown, would be parallel to the threaded post or in the direction of arrow, 50. The slide plate has an elongated slot, 52, which is aligned with at least one securing member, 54, and substantially perpendicular to the belt, wherein the slide plate can move perpendicular to the conveyor belt with the elongated slot slidably receiving the securing member and, once in proper position the securing member reversibly fixes the position of the slide plate relative to the securing member. It is preferable that the securing member be in a fixed position relative to the conveyor belt such as on a structural member of the conveyor. The securing member may be a threaded member engaging with mating threads wherein the securing member can be disengaged by rotation or movement and reengaged with the slide plate by return rotation or movement. A reference point, 56, represented as an indicator is fixed relative to the slide plate. The reference point may be a designated structural element on the slide plate. A scale, 58, which may be permanent or temporary, is in a fixed position relative to the conveyor belt such as being on a structural member of the conveyor, and provides a relative position of the reference point on an axis which is perpendicular to the conveyor belt and parallel to the elongated slot.

A particular advantage of the invention is realized by the ease with which the pressure placed on the conveyor belt can be set, and repeated, as will be described with reference to FIGS. 2, 3 and 4. With a gap between the scraper and conveyor belt the orientable mandrel is secured and rotationally and movably fixed within the fixed mating bracket and release mating bracket as illustrated in FIG. 2. The securing member, 54, is disengaged from the slide plate thereby allowing the slide plate, and elements attached thereto, to move in the direction of the conveyor belt, in the direction of arrow, 50, until the scraper reaches a predetermined distance, and preferably touches which is a desired distance of zero, from the conveyor belt at which point the position of the reference point, 56, is noted by position relative to the scale, 58, thereby establishing a zero mark. Once the zero mark is established the release mating bracket, 34, is allowed to separate from the fixed mating bracket to the extent necessary to allow the orientable mandrel, 30, to disengage with the recesses and therefore rotate or move in a direction sufficient for the scraper to rotate or move away from the conveyor belt as illustrated in FIG. 3. The slide plate is moved a predetermined distance in the direction of arrow 50, to a first positive position. The release mating bracket is drawn towards the fixed mating bracket thereby encouraging the orientable mandrel to be reengaged by the recesses thereby persuading the scraper into contact with the conveyor belt under pressure as the orientable mandrel is closer to the conveyor belt than at the zero mark. If further adjustments are necessary the release mating bracket can be separated from the fixed mating bracket thereby allowing the scraper to rotate or move out of engagement with the conveyor belt and the slide plate can move to a second positive position either closer to the conveyor belt, a positive direction, or further away from the conveyor belt, a negative direction. Once the proper positive position is established the orientable mandrel can be rotated or moved to disengage the scraper from the belt and rotated or moved back to reengage the scraper and conveyor belt as often as necessary while always returning to the same pressure being applied to the conveyor belt without the necessity of readjusting the pressure. This provides a significant advantage in the art.

Figure 5:
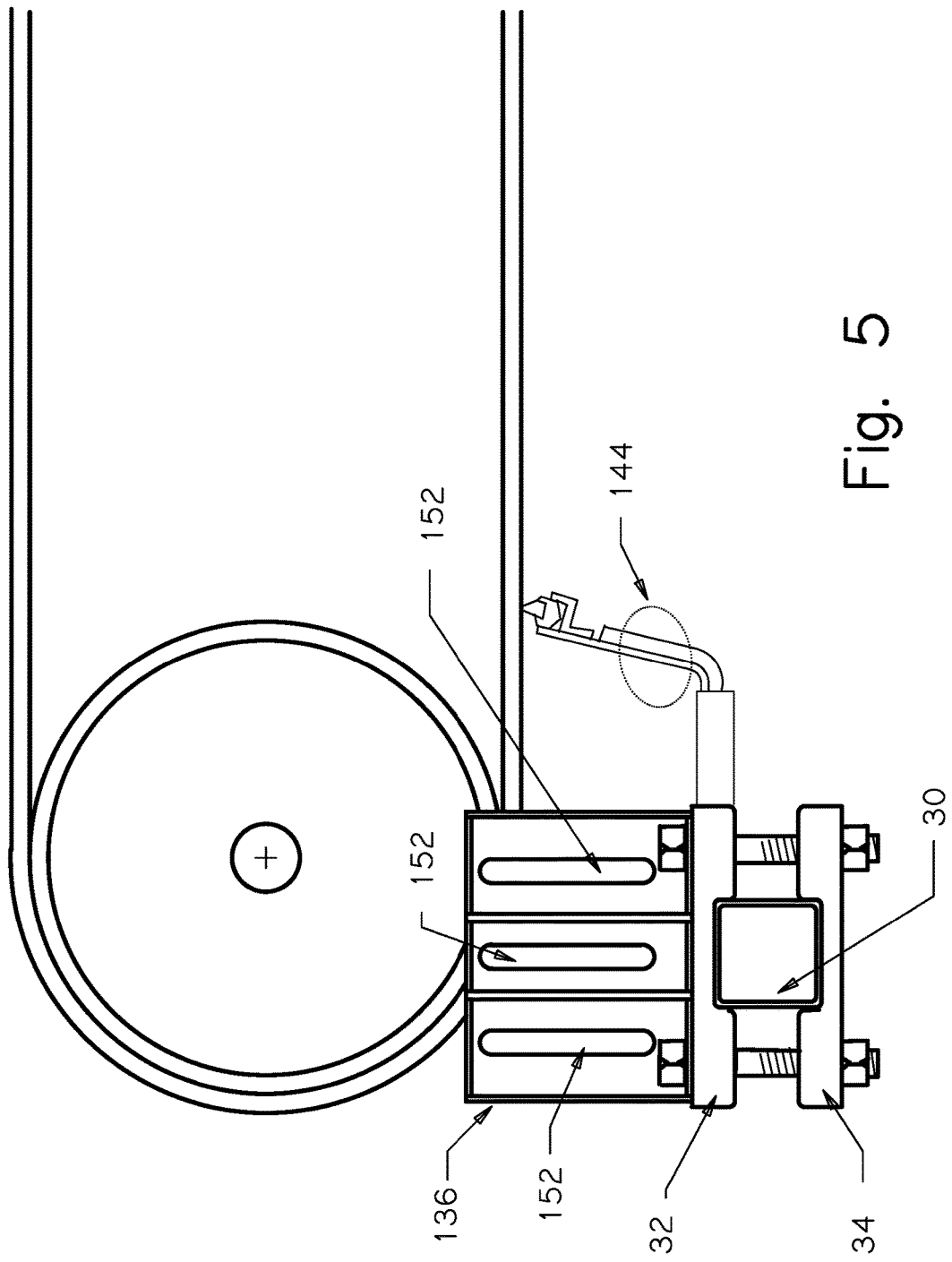
FIG. 5 is a side schematic view of an embodiment of the invention.

An embodiment of the invention will be described with reference to FIG. 5 wherein an alternate embodiment of the slide plate, 136, is illustrated. In FIG. 5, the slide plate comprises multiple elongated slots, 152, wherein the fixed mating bracket, 132 and release mating bracket, 134, are parallel to the conveyor belt, 48. The blade bearing extension, 14, is illustrated as at least one spring and preferably leaf springs in a layered relationship. The embodiment illustrated in FIG. 5 allows for alternate mounting for configurations where a side mount would not be suitable.

An orientable mandrel comprises at least one orientation face thereby allowing either the fixed mating bracket or the release mating bracket to be reversibly drawn into engagement with the orientation face thereby eliminating rotation of the orientable mandrel. It is preferably that the orientable mandrel has at least two orientation faces. A particularly preferred orientation face is a flat face. The cross-sectional shape of the orientable mandrel can be trigonal, rectangular, pentagonal or hexagonal. A rectangular orientable mandrel is particularly preferred due to the perpendicular adjacent faces each of which can be engaged by the recess of a fixed mating bracket or release mating bracket thereby providing additional surface area to prohibit rotation. A square orientable mandrel is preferred due, in part, to the availability of square stock and the flexibility in installation.

The blade bearing extension is preferably flexible, and most preferably a leaf spring assembly, thereby allowing for the scraper to be biased towards the conveyor belt by spring tension such that any temporary separation between the scraper and conveyor belt requires further tensioning of the blade bearing extension and the temporary separation is therefore eliminated due to the spring bias.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A method for adjusting a conveyor belt scraper or cleaner comprising:
   providing a conveyor belt assembly wherein said conveyor belt assembly comprises a conveyor belt capable of receiving and disposing of material on a surface thereof and a structural element fixed relative to a track of said conveyor belt and wherein said structural element comprises a securing member;
   mounting a conveyor belt scraper or cleaner assembly to said conveyor belt assembly wherein said conveyor belt scraper or cleaner assembly comprises:
      a slide plate slidably attached to said structural element wherein said slide plate comprises at least one elongated slot and said elongated slot receives said securing member;
      a fixed mating bracket attached to said slide plate;
      a release mating bracket capable of being reversibly drawn towards said fixed mating bracket wherein at least one of said fixed mating bracket or said release mating bracket comprises a recess;
      an orientable mandrel received between said fixed mating bracket and said release mating bracket wherein said orientable mandrel comprises at least one orientation face wherein said orientation face engages with said recess when said fixed mating bracket and said release mating bracket are drawn together wherein said engagement of said recess and said orientation face reversibly prohibits rotation or movement of said orientable mandrel relative to said structural element; and
      a scraper assembly attached to said orientable mandrel wherein said scraper assembly comprises a scraper capable of engaging with said conveyor belt at a location past a point of said discharge;
   drawing said release mating bracket towards said fixed mating bracket thereby engaging said orientation face in said recess;

moving said slide plate towards said conveyor belt with said securing member sliding in said elongated slot until said scraper is a desired distance from said conveyor belt;

separating said release mating bracket from said fixed mating bracket thereby allowing said orientation face to disengage with said recess and allowing said orientation mandrel to rotate or move wherein said scraper moves away from said conveyor belt;

moving said slide plate a predetermined distance towards said conveyor belt with said securing member sliding in said elongated slot;

tightening said securing member; and drawing said release mating bracket towards said fixed mating bracket thereby engaging said orientation face with said recess thereby causing said orientation mandrel to rotate wherein said scraper moves towards and engages with said conveyor belt.

2. The method for adjusting a conveyor belt scraper or cleaner of claim 1 wherein said desired distance between said scraper and said conveyor belt is zero.

3. The method for adjusting a conveyor belt scraper or cleaner of claim 1 wherein said orientable mandrel has a cross-sectional shape selected from the group consisting of trigonal, rectangular, pentagonal and hexagonal.

4. The method for adjusting a conveyor belt scraper or cleaner of claim 3 wherein said orientable mandrel has a square cross-sectional shape.

5. The method for adjusting a conveyor belt scraper or cleaner of claim 1 wherein said orientation face is a flat face.

6. The method for adjusting a conveyor belt scraper or cleaner of claim 1 wherein said scraper assembly further comprises a blade bearing extension between said orientable mandrel and said scraper.

7. The method for adjusting a conveyor belt scraper or cleaner of claim 6 wherein said blade bearing extension comprises at least one spring.

8. The method for adjusting a conveyor belt scraper or cleaner of claim 6 wherein said blade bearing extension comprises leaf springs in a layered arrangement.

\* \* \* \* \*